April 4, 1939.  W. E. GREENAWALT  2,152,687
ORE ROASTING FURNACE
Filed July 21, 1937  3 Sheets-Sheet 3

INVENTOR.
William E. Greenawalt

Patented Apr. 4, 1939

2,152,687

UNITED STATES PATENT OFFICE 2,152,687

ORE ROASTING FURNACE

William E. Greenawalt, Denver, Colo.

Application July 21, 1937, Serial No. 154,816

20 Claims. (Cl. 266—17)

My invention relates to ore roasting furnaces of the shaft type, in which the ore may be passed through the furnace as a shower falling through a reacting atmosphere heated to the reacting temperature, or it may be passed through the furnace in a substantially vertical column. The invention is adapted for either oxidation or reduction of either ore or gases. It may be used for sulphating, chloridizing, metallizing, or volatilizing, and other specific uses.

The outstanding objects of the invention are to supply reacting gas, distributed in regulable amounts, to the ore in the furnace through hollow members, or beams, spanning the shaft, and to control the temperature of both the ore and the beams within fairly narrow limits, without danger of destroying the hollow beams through excessive heat.

The present invention is an improvement on that described in my co-pending applications, Serial No. 655,201, filed February 4, 1933, and Serial No. 99,192, filed September 3, 1936.

Figure 1:
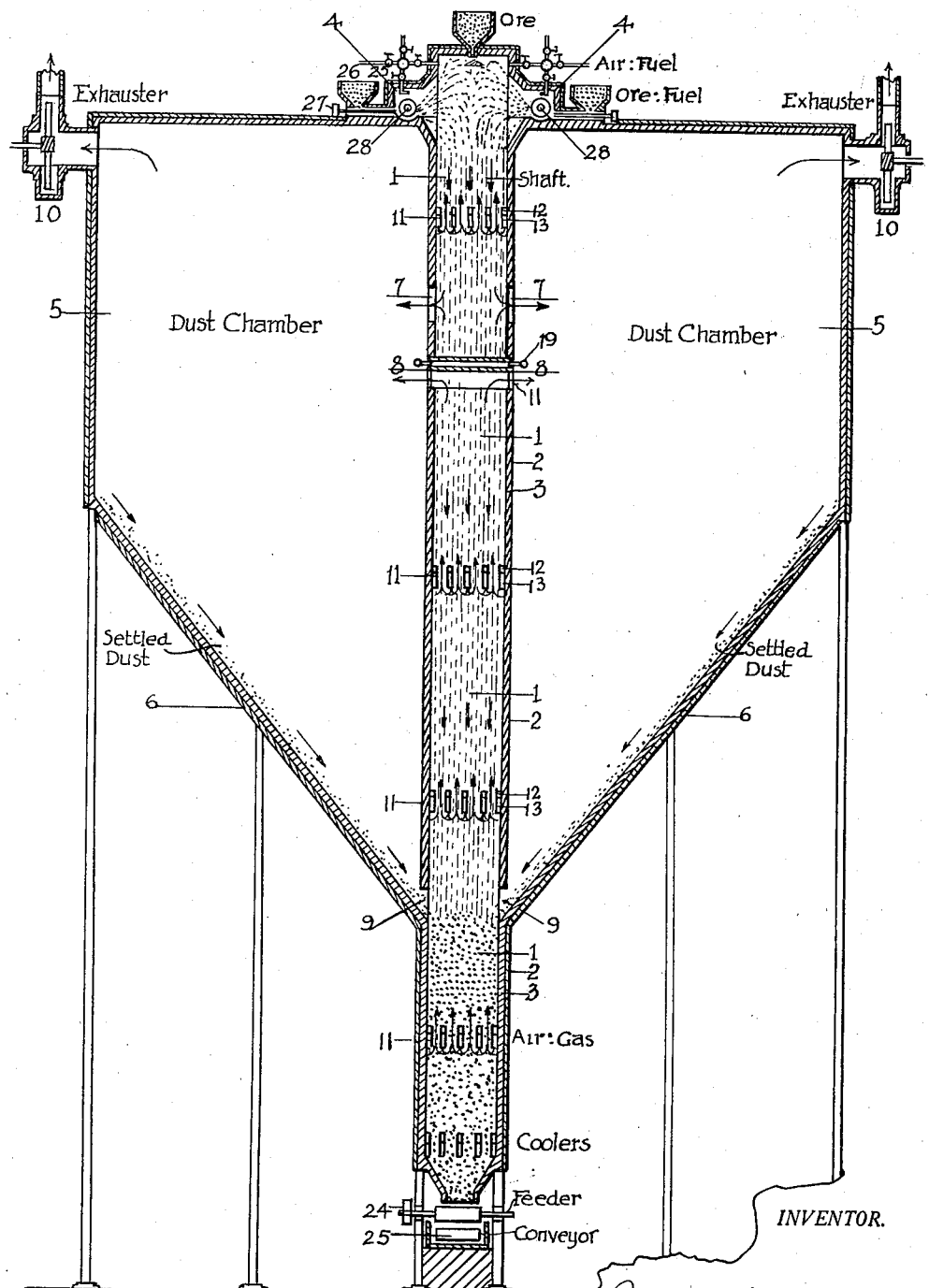
Figure 2:
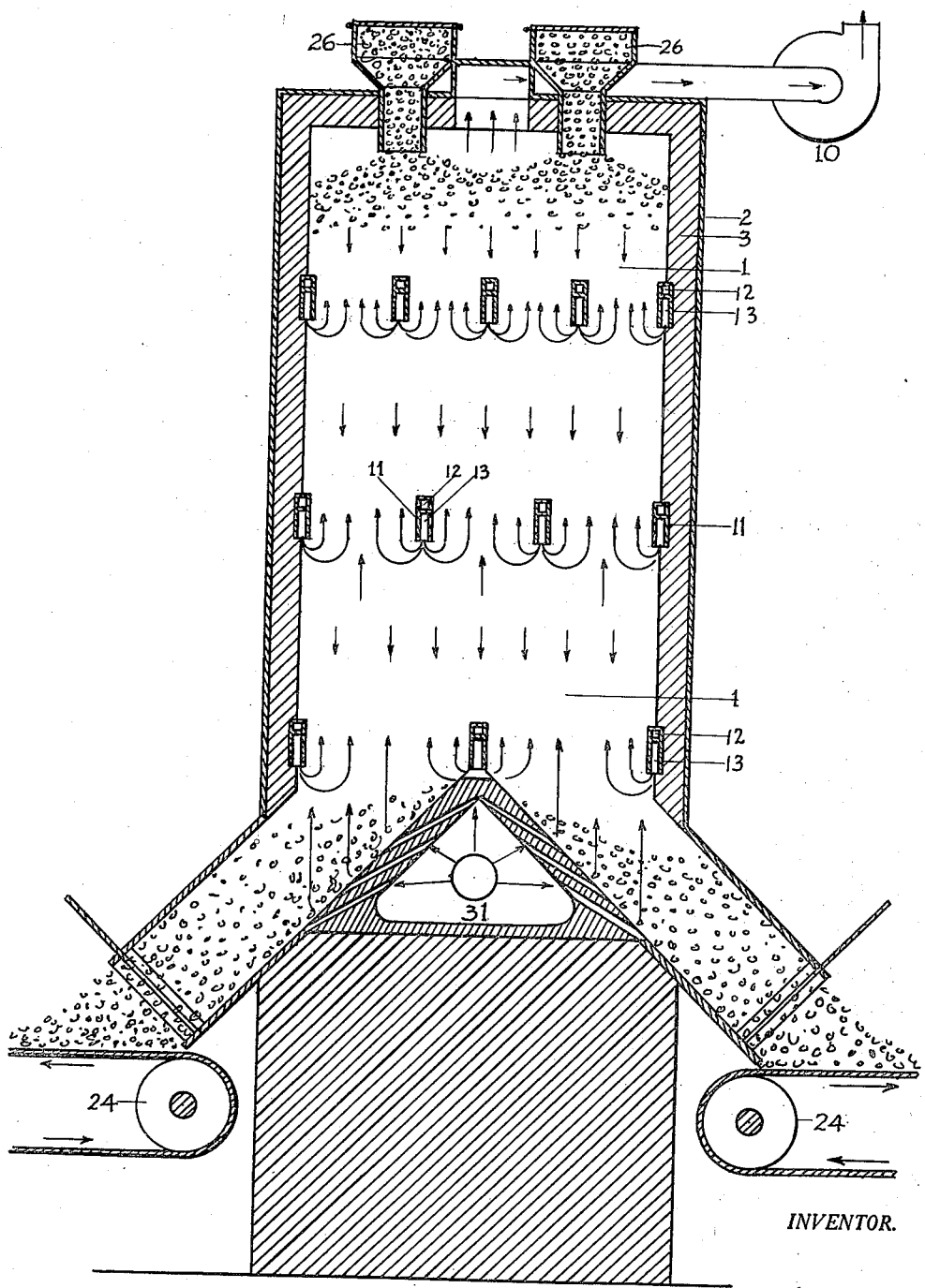
Figure 3:
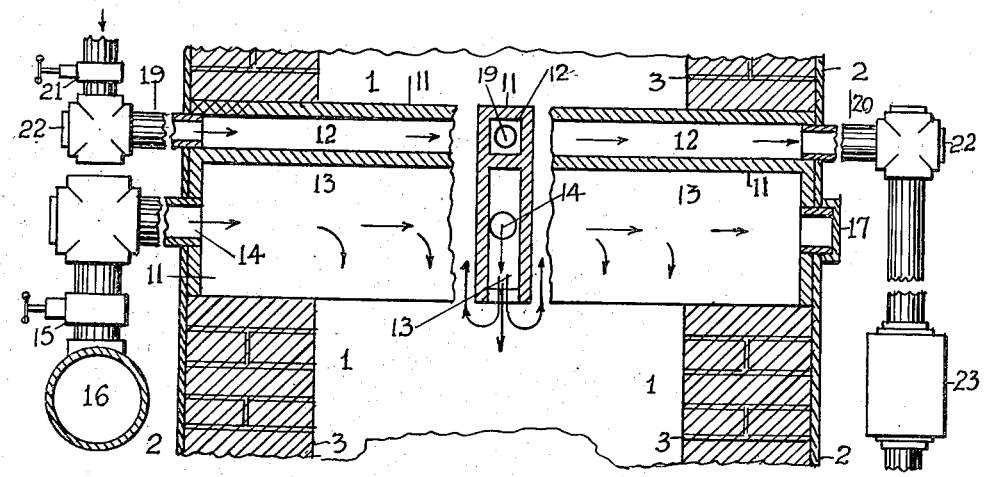
Figure 3:
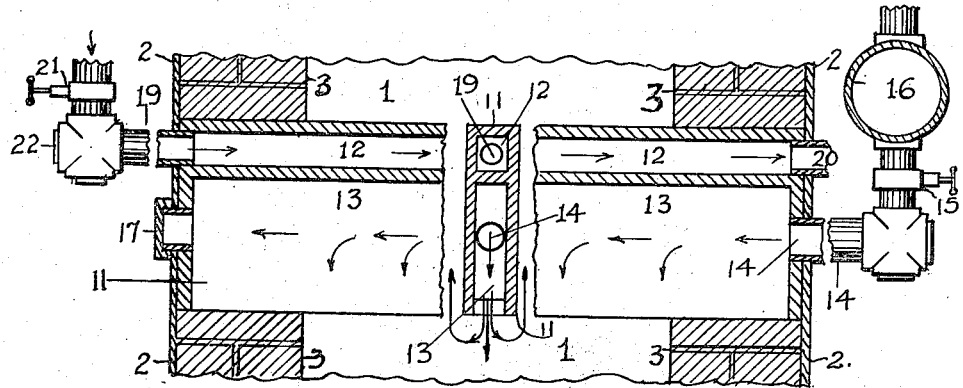
Figure 4:
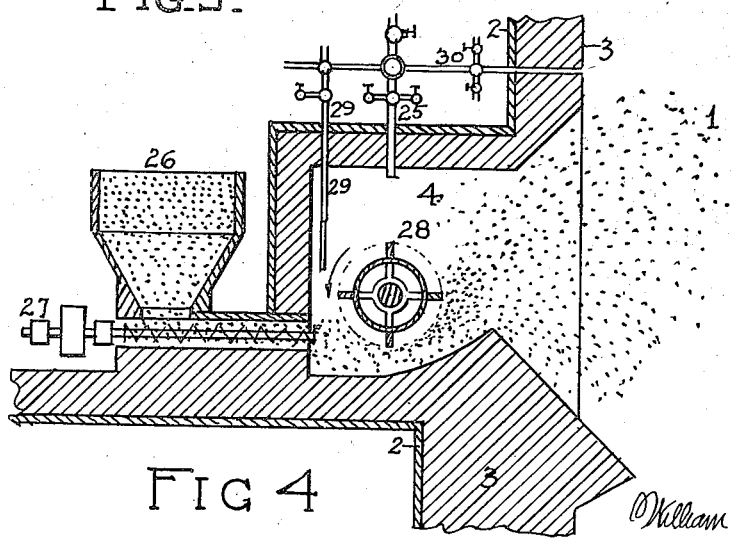

In describing the invention reference may be made to the accompanying drawings, in which Fig. 1 is a vertical section of a shower shaft furnace; Fig. 2 is a vertical cross section of a type in which a column of ore is passed through the shaft by gravity; Fig. 3 is a detail, in longitudinal section, of the hollow beams spanning the shaft; and Fig. 4 is a detail of the device for spraying finely divided ore into the shaft, to be passed through it in a uniform shower.

In the drawings, 1 is a shaft of a suitable height to effect the reactions desired, which will usually vary between 30 and 100 feet. The shaft is composed of a sheet steel housing 2, made fairly tight to prevent the flow of air into the shaft or the escape of gases from the shaft, and a refractory brick lining 3. The fine ore, usually concentrate, is sprayed into the shaft through a spraying, or ignition, chamber 4, communicating with the shaft at its sides toward the top. 5 is a dust chamber arranged alongside of the shaft, with a bottom 6 sloping toward the shaft and arranged to deliver settled dust from the dust chamber back into the shaft by gravity. 7 is an opening between the shaft and the dust chamber through which the gaseous products of the reactions flow from the shaft into the dust chamber 5. This may be more effectively done by exhausting the gaseous products of the reactions through the spaced horizontal hollow beams 8. 9 is the opening between the shaft and the bottom of the dust chamber through which the settled dust flows by gravity from the dust chamber into the shaft.

10 is an exhauster, by means of which the gaseous products of the reactions are exhausted from the shaft into the dust chamber, and from the dust chamber through the exhauster into the air. The exhauster is intended to work under a considerable suction, usually much higher than that obtainable under atmospheric conditions, as through a stack.

11 are horizontal beams, spanning the shaft at intervals, designed to deliver gas into the shaft under working conditions of shaft temperature, in regulable amounts and distributed as desired. The hollow beams are divided into upper and lower sections, 12 and 13. Reacting gas, at any temperature, may be introduced through the lower section, or compartment, 13, into the shaft while at the same time gaseous fluid, or a fluid medium, is passed through the upper section, or compartment, 12, to control the temperature of the hollow horizontal beam. Such an arrangement makes it practical to maintain the most efficient temperature in the shaft for roasting, while at the same time the temperature of the beam may be controlled to avoid its injury or destruction.

Referring now more particularly to Fig. 3; it may be assumed that the shaft is under superatmospheric suction, induced by the exhausters 10. The suction at the exhausters may vary from a few inches of water to 36 inches or more. Atmospheric air will therefore flow automatically through the inlet pipe 14 into the lower section 13 of the hollow beams 11 and into the furnace shaft. Its amount may be regulated, for each beam, by the valves 15, so that the distribution may be made as desired. If the air is heated, or if a gas other than air is to be introduced into the shaft, it will be distributed through the main 16, and introduced in regulable amounts into the section 13 by means of the valves 15. Fuel, such as hydrocarbon gas, atomized oil, or pulverized coal, may be introduced with or without air into the furnace shaft through the lower section of the hollow beams. The interior of the lower section 13 of any beam may be observed, either visually or pyrometrically, through the opening 17, which may also be used as a gas outlet to circulate the gas, if desired. The upper section 12 of the hollow beam is divided from the lower section 13 by an interior partition. Fluid is introduced into the upper section 12 through the inlet pipe 19 and is exhausted through the outlet pipe 20. Its amount and rate of circulation is controlled by the valve 21. The temperature of the interior of the section 12 may be observed, visually or pyrometrically, through peep holes in the plugs 22. The circulation and the temperature of the fluid is regulated in such a way as to limit the temperature of the hollow beam within a reasonable factor of safety under conditions of the most effective temperature for roasting. The fluid may be air, limited in volume to correspond to the desired temperature, or any other gas. It may be circulated through any number of upper sections, and then introduced into any of the lower sections, and from there into the furnace shaft to react with the ore. In this way the excess heat from the upper part of the shaft, where most of the roasting or combustion takes place, may be transferred to the lower part of the shaft to react with the ore after most of the original combustible, such as sulphur or carbon, has been consumed. Or, a cold reacting gas may be circulated through the hot upper sections of the beams in the hotter part of the furnace to cool the beam and heat the gas, and then the hot reacting gas may be introduced into the lower sections of the hollow beams in another part of the furnace, and particularly into the accumulated mass of hot ore in the lower part, or pocket, of the shaft to finish the reactions, or to change the atmosphere from one of oxidation to that of reduction.

It is desirable in many instances to let a certain amount of ore accumulate in a mass in the lower part of the shaft. Air or other gas, especially a reducing gas, may be introduced into this mass of hot ore. If reacting gas, passed through the upper sections of the hollow beams in the hotter parts of the furnace, is not hot enough to effect the reactions desired in the hot mass of ore, the gas issuing from the upper sections of the hollow beams may be superheated, in the super heater 23, before applying it to the ore in the furnace. The ore is exhausted from the lower part of the shaft, in a regulable stream, by means of the feeder 24 and into a conveyor 25, to be delivered where desired.

It is desirable to distribute the ore evenly, in showering it through the shaft. This is done by means of spraying and ignition chambers 4 arranged on opposite sides of the shaft at or near the top. The spraying and ignition chamber, shown in detail in Fig. 4, is provided with a rotary member 28 which, when driven at the proper speed, will uniformly spray the finely divided ore, fed to it from the hopper 26 by the feeder 27, into the upper part of the shaft, so that it will descend in a uniform shower through the shaft. The spraying and ignition chamber 4 is heated to the necessary temperature for quick ignition by means of the oil or gas burner 25. Air, combustible gas, or atomized oil, may be introduced into the spraying chamber just back of the rotor 28, to be mixed with the ore, so that the finely divided ore, intimately mixed with air or other gas, is sprayed through the highly heated ignition chamber into the shaft. Carbon may be mixed with the ore if necessary or desired, and sprayed with the ore into the shaft. The spraying chamber is so designed that the sprayed and ignited ore will be sprayed upwardly into the highly heated upper part of the shaft. The coarser particles will travel the farthest and be under the most intensive conditions for ignition and reaction. By spraying the ore particles upwardly into the shaft they will have to slow down in speed and momentarily come to a neutral position before starting their downward course. This takes time, and time is an important factor in the ignition and initial reactions in treating ore in a shower shaft furnace. If the fine ore or concentrate contains lumps they will be disintegrated by the rotor 28 before the ore is ejected from the spraying chamber into the shaft. Each ore particle, ejected from the spraying chamber, into the shaft, is surrounded with a highly heated atmosphere, which is greatly intensified by the fast travel of the ore particles through this atmosphere.

In roasting sulphide ore most of the sulphur will be almost instantly oxidized in the upper part of the furnace. The sulphur dioxide may be withdrawn from the descending steam of showered ore as shown at 7 Fig. 1. But in large furnaces this may be objectionable because the gas cannot very well be withdrawn in a uniform horizontal section across the shaft. This condition is met by placing hollow horizontal beams across the shaft, spaced at regular intervals, shown at 8, through which the sulphur dioxide may be drawn through the lower section of the beams into the dust chamber in a uniform section through the shaft, while at the same time the temperature of the beams may be controlled by passing fluid through the upper section. The same general type of beam and arrangement is used that is employed in introducing gas into the furnace shaft. By thus withdrawing the gaseous products of the reactions from the shaft, the flow of gas will be relatively slow, and hence the dust exhausted from the shaft with the gas will be relatively small in amount. The distance between the spraying chamber and the gas exit from the shaft should be great enough to permit of practically complete oxidation of the very fine dust that might be carried into the dust chamber with the gas current. Fresh air or other gas may be introduced at intervals into the shaft, and the gas introduced through the hollow beams is immediately distributed through the descending shower of ore. It will usually be desirable to accumulate a mass of the showered or roasted ore in the lower part of the shaft, or pocket, and introduce gas into this mass of hot ore. The same kind of beams may be used for this as those in the upper part of the furnace. The amount of gas so introduced will be relatively small, because most of the gas consuming reactions have taken place in the upper part of the shaft. The hot air or other gas introduced into the mass of ore in the lower part of the shaft will pass upwardly and react with the ore being showered through the shaft. If, as may frequently happen, it is desired to heat the gas to a higher temperature than that obtainable by passing the gas through the upper sections of the hollow beams in the upper part of the furnace it may be passed through the super heater 23, Fig. 3, and heated to any temperature desired.

Referring to Fig. 2, which represents the invention applied to ore which is too coarse for flash or shower roasting; the ore, instead of being passed through the shaft in a showered stream, is passed through in a vertical column, much the same as that passed through the lower part of the shaft furnace in an accumulated mass. The hollow beams, as in Fig. 1, are used to introduce reacting gas into the shaft, through the lower section 13, and bringing it in intimate contact with the ore, and the temperature is controlled in the same way by passing fluid through the upper section 12. The exhauster produces sufficient suction inwardly through the entire furnace so that gases will flow inwardly and not outwardly. The hot temperature-controlling gas from the upper sections of the beams in the upper part of the furnace may be introduced into the partly roasted ore in the lower part, either through hollow beams or through a gas distributor 31, or both combined. This gas distributor also acts as a support for the central lower beam to keep it from sagging under a high heat. It is preferred to remove the dust-producing fines from the ore, crushed to a suitable size for roasting. This will make practical a uniform flow of gas through the shaft from the bottom to the top, and the gas exhausted from the shaft will be practically dustless. As in Fig. 1, gas may be withdrawn from the shaft through a set of the hollow beams, but this will not usually be necessary.

In operating the invention as applied to roasting fine sulphide ore or concentrate, the ore is sprayed from the hopper 26 through the spraying, or ignition, chamber 4 into the shaft. Carbonaceous fuel may be used to bring the ignition chamber to the temperature for quick ignition. Air, carbon, or hydrocarbon, may be fed with the ore to the rotor 28, and thoroughly mixed with it as it leaves the rotor and is injected through the ignition chamber into the shaft, and passes downwardly in a uniform shower. The gaseous products of the reactions are withdrawn from the shaft, through the gas outlets 7 or 8, into the dust chamber, where the dust is settled from the gas. The gas flows from the dust chamber through the exhauster 10, which is adjusted to give the desired suction throughout the furnace. The settled dust is returned by gravity to the shaft through the openings 9 and is there mixed with the roasted ore in the shaft. Air or other gas may be introduced at any temperature in regulable amounts into any of the various hollow beams and from the beams into the furnace shaft. The fluid passing though the upper sections of the hollow beams is regulated in temperature and in amount so that the temperature of the beam is kept within safe working limits. This can best be done by means of a thermostat arrangement. If the shaft is too hot, a cooling fluid is passed through the upper section 12 of the beam; if the beam is too cold, a heating fluid is passed through the compartment.

Ordinarily, in roasting finely divided pyritic or sulphide ore, most of the sulphur will be oxidized in the upper part of the furnace, and this will result in creating excessive heat and an excessive amount of vitiated gas. The vitiated gas is preferably drawn off at some distance below the introduction of the ore; this will permit the roasting of the finely divided particles of dust before they pass from the shaft into the dust chamber. The amount of air introduced into the upper part of the shaft should be regulated, or limited, so as to control both the temperature and oxidation.

It will ordinarily be desirable to eliminate some of the residual sulphur after the showered ore has accumulated in the pocket in the lower part of the shaft. This may be done by introducing the hot air, passed through the upper sections 12 of the hollow beams in the upper part of the shaft, into the lower section 13 of the hollow beams in the pocket of the shaft, and from there into and through the ore in the pocket. The hot gas, passing through the ore in the pocket, will then pass upwardly against the shower of descending fine ore, and then pass into the dust chamber through the openings 7 or 8. If the air from the upper compartments 12 of the hollow beams is to be superheated it may be passed through the superheater 23 and heated to any temperature desired before bringing it in direct contact with the ore in shaft.

The spacing of the hollow beams may be fairly close—as close as necessary to get the best distribution of the gas through the showered ore— because there will not be any danger of arching, as may happen in a descending column of coarse ore through the shaft. The hollow beams should be fairly narrow, and have depth enough to act effectively as a beam, to minimize, or avoid, possible bending, or injury, under the temperatures of continuous operation.

The ignition of the sulphide particles will be almost instantaneous, but the temperature and the air should be so controlled as to make the roasting gradual, to avoid fusion, or excessive fusion, in the upper part of the furnace.

If, in addition to oxidizing roasting, it should be desirable to sulphatize for leaching, concentrated sulphur dioxide, from the upper part of the furnace, may be introduced into the ore in the pocket or in the lower part of the shaft. The sulphur dioxide should be superheated to get the best results, and sulphatizing can be effectively controlled in this way.

The operation as applied to a vertical column of coarse ore or concentrate, Fig. 2, is much the same as that applied to the ore showered through the shaft, Fig. 1. The ore, introduced into the shaft through the hopper 26 is quickly brought to a reaction temperature by means of the hot air and other gas passing through it from the hot reacting ore below, or just above the upper tier of hollow beams. Carbonaceous fuel may be introduced with the air through the hollow beams and into the ore. The temperature of the ore can be regulated by the amount and distribution of air or other gas introduced through the lower sections 13 of the hollow beams 11. Most of the sulphur can be eliminated in the upper part of the furnace. Air or other gas, hot or cold, may be introduced into the lower tier of beams or through the chamber 31 into the ore, and the hot gas passing upwardly through the hot ore, will heat and react with either ore or other gas introduced into the shaft. It will usually be desirable to remove the extreme fines from the ore before roasting; this will give a more uniform percolation of the gas through the ore, and dust chambers will not ordinarily be necessary.

The extreme fines may also be removed to advantage preparatory to shower roasting, for some purposes.

Efficient temperature control of both the roasting and the beams is important. To illustrate; finely crushed pyrites containing 53.4 per cent sulphur roasted for 2.75 hours at 1250 deg. F., under ordinary conditions with free access of air contained 0.70 per cent sulphur; roasted at a temperature of 1600 deg. F. for 20 minutes under the same conditions, it contained 0.78 per cent sulphur; and roasted for 45 minutes it contained 0.08 per cent. Roasted for 20 minutes at 1800 deg. F. it contained only 0.13 per cent sulphur, and at 2200 deg. F. roasted for 20 minutes it contained 5.92 per cent sulphur. In flash roasting of very finely divided pyrites sulphur can be almost completely eliminated in a few seconds. It is evident therefore, that roasting, preparatory to smelting, should be done at a temperature of between 1400 and 1800 deg. F., and at this roasting temperature of the shaft the beams can be maintained within safe limits, or not to exceed 1600 deg. F., since the beams may be maintained cooler than the surrounding temperature of the ore or furnace, and almost all special alloys for the purpose will stand this temperature indefinitely without injury. For sulphatizing for copper leaching the initial temperature should be rather low—from 800 to 900 deg. F.— and the finishing temperature should be from 1000 to 1200 deg. F. in the presence of sulphur dioxide, and cheap iron alloys are easily obtainable to withstand these temperatures indefinitely.

If the roasted ore is to be smelted, the temperature need not be controlled as carefully as with roasting for wet treatment, and partial fusion of the roasted ore will usually be desirable, and if the roasted ore is to be sintered for smelting or zinc reduction, the slightly fused roasted ore will make an excellent sinter charge.

In other uses of the invention temperatures will have to be controlled more carefully than in simple pyrite or other sulphide roasting. In the distillation of zinc, for example, a temperature of from 1000 to 1200 deg. C., or even higher, may be desirable for effective distillation of the zinc, either in the form of oxide or the metal. Close regulation of the temperature of the beams is essential. Special alloy metals will safely stand this temperature, but with a comparatively narrow factor of safety. The beams will usually be slightly cooler than the furnace or the hot ore in the furnace, and this presents a factor of safety for the beam in continuous operation. The temperature of the beam can be more accurately controlled to last indefinitely than externally heated retorts in which the heat has to be transmitted through the shell from a combustion chamber necessarily heated at a considerably higher temperature than the efficient reacting temperature within the retort, and the penetration of the heat in any externally heated retort, is strictly limited.

Similarly, in the reduction of hematite to magnetite, or in the reduction of any iron ore to sponge iron; the temperature should not be less than 950° C., and should be about 1000 to 1100 deg. C. This is practical with special alloys for the hollow beams, under temperature control. Thermostat control of the temperature in such cases may be necessary or desirable.

If the ore is passed through the shaft in a vertical column, as shown in Fig. 2, it is preferred to separate the slimes, or extreme fines, from the coarser material, or sands, principally with a view of getting better percolation of gas through the ore and to more uniformly distribute the gas through the ore. Dust chambers, then, will not ordinarily be necessary. Except for the special means of introducing the ore into the shaft, Fig. 2 may also represent, in detail, the lower part of the shaft, or pocket, as shown in Fig. 1, in which gas is introduced into an accumulation of a mass of ore after it has been showered through the upper part of the shaft.

Ordinarily it will be desirable to make the shaft rather high and feed the ore, undried, into the shaft or into the ignition chamber. The moist or undried ore is more difficult to ignite than dry or hot ore, but it is cheaper and better to make a higher shaft or provide for special ignition, as in the ignition chambers, than it is to separately dry or heat the ore preparatory to roasting.

I claim:

1. An ore roasting furnace comprising, a shaft, a stationary hollow beam divided by an internal partition into upper and lower sections within the shaft, means for passing gaseous fluid through the upper section of the hollow beam, means for passing the gaseous fluid issuing from the upper section into the lower section and from there into the shaft, and means for passing the ore through the shaft.

2. An ore roasting furnace comprising, a shaft, hollow horizontal beams spanning the shaft at different elevations, said beams being divided by an internal partition into upper and lower sections, means for passing gaseous fluid through the upper section of a beam at one elevation and then through the lower section of a beam at a different elevation and into the shaft, and means for passing the ore through the shaft.

3. An ore roasting furnace comprising, a shaft, a superheater for heating gaseous fluid, hollow beams within the shaft each divided into an upper section out of direct communication with the shaft and a lower section in direct communication with the shaft, means for passing gaseous fluid through the upper section of the hollow beams, then through the superheater, then through the lower section of the hollow beams and into the shaft, and means for passing the ore through the shaft.

4. A roasting furnace comprising, a shaft, a dust chamber, hollow beams open at the bottom spanning the shaft and spaced apart and communicating with the dust chamber, means for showering finely divided ore through the shaft, means for withdrawing gaseous products of the reactions from the shaft through the hollow beams into the dust chamber to settle the dust, and means for returning the settled dust to the shaft by gravity.

5. An ore roasting furnace comprising, a shaft, a hollow stationary beam within the shaft divided by an internal partition into an upper section out of direct communication with the shaft and a lower section in direct communication with the shaft, means for passing gaseous fluid through the upper section, means for passing gaseous fluid into the lower section, and means for showering the ore through the shaft.

6. An ore roasting furnace comprising, a shaft, hollow horizontal beams spanning the shaft and spaced apart, said beams being divided by an internal partition into an upper section out of direct communication with the shaft and a lower section in direct communication with the shaft, means for showering finely divided ore through the shaft and passing it downwardly between the hollow beams, means for controlling the temperature of the upper section of the hollow beams, and means for withdrawing gaseous products of the reactions from the shaft through the lower section of the hollow beams.

7. An ore roasting furnace comprising, a shaft, an upper set of hollow horizontal beams open at the bottom in communication with the shaft and spaced apart, a lower set of hollow horizontal beams open at the bottom communicating with the shaft and spaced apart, means for passing gaseous fluid through the upper set of beams into the shaft, means for withdrawing gaseous products of the reactions from the shaft through the lower set of hollow beams, and means for showering finely divided ore through the shaft and downwardly between the beams.

8. An ore roasting furnace comprising, a shaft, hollow horizontal beams divided by an internal partition into an upper section out of direct communication with the shaft and a lower section in direct communication with the shaft, means for passing a fluid medium through the upper section of the beams, means for passing a gaseous fluid through the lower section, and means for showering finely divided ore through the shaft.

9. An ore roasting furnace comprising, a shaft, an ignition chamber outside the shaft, and means within the ignition chamber for spraying finely divided ore upwardly into the shaft to be showered downwardly through the shaft.

10. An ore roasting furnace comprising, a shaft, hollow horizontal beams divided by an internal partition into an upper section out of direct communication with the shaft and a lower section in direct communication with the shaft spanning the upper portion of the shaft, means for passing a fluid medium through the upper section of the beams, means for passing a gaseous fluid through the lower section of the beams and from there into the shaft, and means for passing the ore through the shaft.

11. An ore roasting furnace comprising, a shaft, oppositely positioned spraying chambers communicating with the shaft through its exterior side walls, rotors within the spraying chambers for spraying finely divided ore from the spraying chambers toward the center of the shaft and showering it downwardly through the shaft.

12. An ore roasting surface comprising, a shaft, a hollow stationary horizontal beam in the heating zone of the shaft divided by an internal partition into a plurality of sections, means for passing gaseous fluid into one section and from there into the shaft, means for passing a fluid medium through another section to control the temperature of the beam, and means for passing the ore through the shaft.

13. An ore roasting furnace comprising, a shaft, hollow stationary members in the heating zone of the shaft, means for introducing reacting gas into the hollow members and from there into the shaft, means independent of the temperature of the reacting gas introduced into the shaft and the temperature of the furnace for controlling the temperature of the hollow members, and means for passing the ore through the shaft.

14. An ore roasting furnace comprising, a shaft, a dust chamber, hollow beams spaced apart spanning the shaft and having open bottoms in direct communication with the shaft and open ends in direct communication with the dust chamber, means for showering finely divided ore through the shaft to roast it, and means for withdrawing the gaseous products of the roasting reactions from the shaft through the hollow beams into the dust chamber.

15. An ore roasting furnace comprising, a shaft having opposite external side walls exposed to the atmosphere, dust chambers communicating with the shaft adjacent the other opposite side walls, hollow beams spanning the shaft from one exposed side wall to the opposite exposed side wall, means for introducing gaseous fluid through the ends of the hollow beams through an exposed side wall of the shaft and into the shaft, means for showering finely divided ore through the shaft to roast it, and means for withdrawing the hot gaseous products of the roasting reactions from the shaft into the dust chambers to settle the dust.

16. An ore roasting furnace comprising, a shaft capable of roasting finely divided ore showered through it, an ignition chamber outside of the shaft, means for introducing fuel into the ignition chamber to heat it, and means within the ignition chamber for spraying finely divided ore from the ignition chamber into the shaft.

17. An ore roasting furnace comprising, a shaft, oppositely positioned ignition chambers located externally of the shaft, means for introducing finely divided ore and reacting gas into the ignition chambers, and rotors within the ignition chambers for ejecting the ore from the ignition chambers toward the center of the shaft and showering the ore through the shaft.

18. An ore roasting furnace comprising, a shaft, a dust chamber, one set of hollow horizontal beams spanning the shaft, means for introducing reacting gas into the shaft through the hollow beams, a second set of hollow horizontal beams spanning the shaft and communicating with the dust chamber, means for showering finely divided ore through the shaft to roast it, and means for withdrawing the hot gaseous products of the roasting reactions into the dust chamber through the second set of hollow beams.

19. A roasting process comprising, showering finely divided ore through a shaft furnace to roast it, accumulating a mass of the hot roasted ore in the lower part of the furnace, passing reacting gaseous fluid through the accumulated mass of hot roasted ore to complete the roasting reactions, then lowering the mass of the hot roasted ore in the furnace and introducing a cooling fluid into the mass to cool it, and removing the cooled ore from the furnace.

20. An ore roasting furnace comprising, a roasting chamber, a hollow stationary beam within the roasting chamber divided by an internal partition into a plurality of sections one section of which is open at both ends to permit fluid to pass through it without entering the roasting chamber and a second section of which is open to the roasting chamber to permit gaseous fluid introduced into it to enter the roasting chamber, means for introducing gaseous fluid into the second section of the beam and from there into the roasting chamber, and means for passing the ore through the roasting chamber.

WILLIAM E. GREENAWALT.